O. GAEBEL.
APPARATUS FOR PREPARING COFFEE SUBSTITUTES.
APPLICATION FILED MAR. 24, 1911.
995,956.
Patented June 20, 1911.
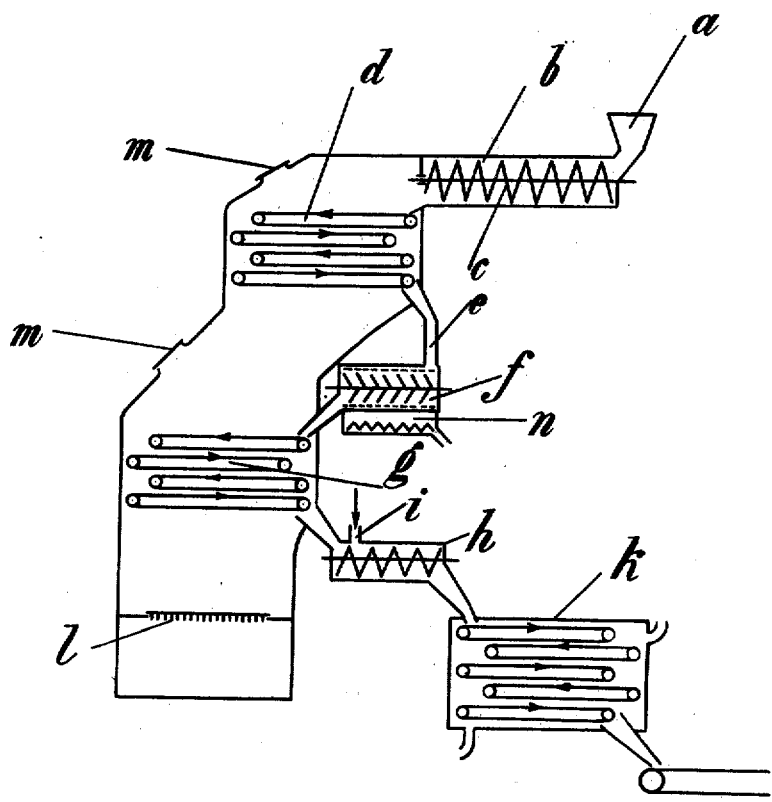

UNITED STATES PATENT OFFICE.

OTTO GAEBEL, OF BRESLAU, GERMANY.

APPARATUS FOR PREPARING COFFEE SUBSTITUTES.

995,956.  Specification of Letters Patent.  Patented June 20, 1911.

Application filed March 24, 1911. Serial No. 616,692.

*To all whom it may concern:*

Be it known that I, OTTO GAEBEL, a subject of the German Emperor, and residing at Breslau, German Empire, have invented certain new and useful Improvements in Apparatus for Preparing Coffee Substitutes, of which the following is a specification.

My invention relates to improvements in apparatus for preparing coffee substitutes from grain, popularly known as "malt coffees."

In the manufacture of such substitutes it has of late become the practice to employ green malt as raw material. The preparation involves three steps, viz. saccharification, drying, and roasting. According to my new process on the contrary the work is actually continuous, the material constantly advancing during the entire period of its treatment, so that at the one end of the apparatus the raw material is continually being fed in, while at the other end the finished product is being continually delivered.

The advantages secured by my new method of working are the following:—The temperatures in the individual devices can be exactly regulated, so that for instance the malt germs can be removed before temperatures over 100° are reached, whereby the full nutritive value is retained. The heating gases are thoroughly utilized, since the material is heated directly; the hot gases moreover have to pass over a long path and working is continuous and not intermittent, so that idle intervals and consequent loss of heat are avoided. The quantity of the material which can be treated in a definite period of time, in a given space, is greater than hitherto. The working goes on automatically, so that there is a great saving in labor effected. The quantity of material being treated at any given moment is relatively small, so that vapors given off by the roasted material, though arising continually, are strictly limited in amount and so do not prove annoying. The apparatus is therefore of great hygienic value. The product obtained is extremely uniform in character; it possesses an exceedingly pleasant flavor, and a strong aroma resembling that of genuine coffee.

One form of construction of my new apparatus is illustrated in the accompanying drawing, in which the figure is a vertical section.

The material, consisting of green malt, is fed through the hopper $a$ into the space $b$, in which there is located a screw conveyer $c$, which advances the material. In the space $b$ the green malt is saccharified at the requisite temperature and when ready it drops onto the trays $d$, which consist of endless wire webs or aprons. On these the malt now undergoes a preliminary drying and finally descends the shaft $e$ to the cleaning and hulling contrivance $f$. This latter consists of a sieve-drum with beating mechanism, the beaters of which are so arranged that they simultaneously advance the material, and of a collecting and conveying device $n$ for the cleaned malt germs. From the cleaner the material passes to the roasting apparatus $g$, which like the drying device $d$ consists of a plurality of endless wire-fabric aprons constituting trays. After passing over the roasting apparatus the material falls into the glazing contrivance $h$. This consists substantially of a spiral conveyer located in a cylinder. At the mouth of the cylinder, where the material enters, there is an inlet-pipe $i$, through which the glazing constantly flows in. After the material has been glazed it passes for a further drying into a vessel $k$ containing a number of endless traveling aprons arranged in the same manner as those at $d$ and $g$. The finished product can then be conducted to the storage room by means of any suitable conveyer on which it is at the same time cooled.

The entire apparatus is provided with a heating device $l$ which supplies the hot air necessary for raising the material at the various places to the desired temperature. For regulation of the temperature, flaps or covers $m$ are furnished, through which outside air can be allowed to enter the apparatus.

The drying device $k$ can either be furnished with a special heating contrivance, or the hot air can be conducted to it from the furnace of the roasting device. The glazing apparatus and the cleaning device are not traversed by the hot air.

Having thus described my invention, I declare that what I claim as new and desire to secure by Letters Patent is—

1. An apparatus for preparing coffee substitutes from malt in a continuous operation, consisting of saccharifying means, feeding means in the saccharifying means to move the material therethrough, drying means connected to said saccharifying means, feeding means in the drying means to advance the material as it comes from the saccharifying means, cleaning means connected to the drying means, feeding means in the cleaning means to advance the material received from the drying means, roasting means connected to said cleaning means, feeding means in the roasting means to advance the material received from the cleaning means, glazing means connected to the roasting means, feeding means in the glazing means to advance the material received from the roasting means, second drying means connected to the glazing means, and feeding means in the second named drying means to receive the material and convey same therethrough.

2. An apparatus for preparing coffee substitutes from malt in a continuous operation, consisting of a saccharifying device, a drying device connected to the discharge end of said saccharifying device, a cleaning device connected to the discharge end of the drying device, a roasting device connected to the discharge end of the cleaning device, a glazing device connected to the discharge end of the roasting device, a second drying device connected to the discharge end of the glazing device, and means in each of said devices to successively and continuously feed the material from one to the other in the order named.

3. An apparatus for preparing coffee substitutes from malt in a continuous operation, comprising, in combination, a saccharifying chamber having a discharge and containing a spiral conveyer, a drying device connected to said discharge and having a series of superposed endless traveling aprons therein, a cleaning device connected to the discharge of said drying device, feeding means in the cleaning device to advance the material received from the drying device, a roasting device connected to the discharge of the cleaning means and having an assemblage of superposed endless traveling aprons therein, a glazing chamber connected to the roasting device discharge and containing a spiral conveyer to advance the material received from the glazing chamber, and a further drying device connected to the glazing chamber discharge and having an assemblage of superposed endless traveling aprons, and means for heating the drying and roasting devices.

In testimony whereof I affix my signature in presence of two witnesses.

OTTO GAEBEL.

Witnesses:
SIEGFRIED LUSTIG,
LOUIS KAY.

Copies of this patent may be obtained for five cents each, by addressing the "Commissioner of Patents, Washington, D. C."